United States Patent Office 3,272,712
Patented Sept. 13, 1966

3,272,712
QUATERNARY AMMONIUM SALTS OF ESTERS OF FATTY ACIDS AND A PRECURSOR OF AMINO-2-HYDROXY PROPANOL, METHODS OF THEIR PREPARATION AND THEIR USE
Gregoire Kalopissis, Paris, and Guy Vanlerberghe, Villiers-le-Bel, France, assignors to Societe Anonyme dite: L'Oreal, a corporation of France
No Drawing. Original application Oct. 29, 1962, Ser. No. 233,909. Divided and this application May 20, 1965, Ser. No. 469,018
Claims priority, application France, Nov. 2, 1961, 877,753
18 Claims. (Cl. 167—87)

This application is a division of application Serial No. 233,909, filed October 29, 1962.

This invention relates to novel quaternary ammonium compounds, to processes for their production and to their use especially in cosmetic preparations.

According to a first feature of the present invention there are provided quaternary ammonium compounds of the general Formula I:

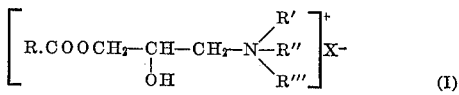
(I)

wherein R represents a hydrocarbon group having from 10 to 18 carbon atoms, R' and R'' represent, when they are taken separately, alkyl groups having 1 to 4 carbon atoms or hydroxyalkyl groups having 1 to 4 carbon atoms, and represent, when they are taken together with the nitrogen atom to which they are attached, a morpholine, piperidine or pyrrolidine group, R''' represents an alkyl group of 1 to 4 carbon atoms, a hydroxyalkyl group of 1 to 4 carbon atoms or an alkylphenyl residue, for example, benzyl, and X is an anion, e.g. chloride, bromide or iodide, or the group —SO₄CH₃, and compounds of the general Formula II:

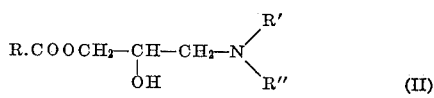
(II)

which are the bases of which the compounds of general formula I are the quaternary ammonium salts.

According to a further feature of the invention there is provided a process for the production of compounds of general Formulae I and II which comprises reacting together substantially equimolecular proportions of an alkali metal salt of an aliphatic carboxylic acid of 10 to 18 carbon atoms of the general formula R.COOH with an epihalohydrin and a secondary amine of the formula

in a solvent medium, separating the alkali metal halide which is formed and thereby isolating a compound of general Formula I, and to produce a compound of general Formula II, and thereby isolating a free base to which is added a quaternizing agent R'''X, in which R''' is a lower alkyl or a benzyl.

Suitable acids for the process are, for example, lauric, myristic, palmitic and stearic acids. Preferred acids are the copra fatty acids and the tallow fatty acids.

Suitable secondary amines of formula

are, for example, dimethylamine, diethylamine, diethanolamine, morpholine, piperidine and pyrrolidine.

The epihalohydrin employed is preferably epichlorohydrin.

Suitable agents for addition to a compound of Formula II, are, for example, dimethyl sulphate, methyl bromide, ethyl iodide, benzyl chloride and glycol chlorohydrin.

Suitable solvents for use as reaction media are, for example, isopropyl alcohol and tertiary butyl alcohol.

Compounds of general Formula I, according to the invention, have surface-active properties and are accordingly useful in various fields. They are of especial value in cosmetics and more particularly in the formulation of hair shampoos.

The compounds of general Formula I, when employed for the treatment of hair, impart thereto a gloss and a more pleasant handle and facilitate combing and dressing. Moreover, they have the essential advantage in the shampoo field that they are very well tolerated by the mucous membrane of the eye.

This latter property has been demonstrated by tests carried out on the eyes of rabbits. The right eye of the rabbits was treated with a solution containing a compound of general Formula I according to the invention, while the left eye was treated with a solution of cetyl-trimethylammonium bromide, which is a known quaternary ammonium compound in current use.

The tests are summarized in the following tables:

TABLE I

| Rabbits | Application of a Solution of $\left[\text{R.COOCH}_2\text{—CH—CH}_2\text{N}\begin{smallmatrix}\text{CH}_3\\\text{C}_2\text{H}_5\\\text{C}_2\text{H}_5\end{smallmatrix}\right]^+ \text{SO}_4\text{CH}_3^-$ with OH on middle carbon, in a concentration of 0.1 M (4.69%) in which R.COO=copra fatty acid residue pH=3.5 | | Application of a Solution of Cetyltrimethylammonium Bromide in a Concentration of 0.1 M pH=3.5 | |
|---|---|---|---|---|
| | Right Eye | | Left Eye | |
| | Observation 24 h. after application | Observation 7 days after application | Observation 24 h. after application | Observation 7 days after application |
| No. 1 | 2+ | Healed | 5+ +a | Healed. |
| No. 2 | 2+ | do | 5+ + +b | Healed—cornea less shiny. |
| No. 3 | 2 | do | 5+ + +b | Eyelid deformed—opaque cornea. |
| No. 4 | 2 | do | 2+ + +b | Partially opaque cornea. |

TABLE II

| Rabbits | Application of a Solution of— $$\left[ R.COOCH_2CHOH-CH_2-N\begin{array}{c}CH_3\\C_2H_4OH\\C_2H_4OH\end{array} \right] SO_4CH_3^-$$ in a concentration of 0.1 M—(mol. wt.=487) in which R.COO= copra fatty acid residue. pH=3.5 | | Application of a Solution of Cetyltrimethylammonium Bromide in a Concentration of 0.1 M<br><br>pH=3.5 | |
|---|---|---|---|---|
| | Right Eye | | Left Eye | |
| | Observation 24 h. after application | Observation 7 days after application | Observation 24 h. after application | Observation 7 days after application |
| No. 1 | Nothing | Nothing | 5++a | Healed. |
| No. 2 | 2, weak | Healed | 5+a | Do. |
| No. 3 | Nothing | Nothing | 3++a | Do. |
| No. 4 | ___do___ | ___do___ | 5+++b | Opaque cornea—eyelid deformed. |

TABLE III

| Rabbits | Application of a Solution of— $$\left[ R.COOCH_2CHOH-CH_2-N\begin{array}{c}CH_3\\C_2H_5\\C_2H_5\end{array} \right]^+ SO_4CH_3^-$$ in a concentration of 0.05 M—(mol. wt.=526) in which R.COO= residue of tallow fatty acids. pH=3.5 | | Application of a Solution of Cetyltrimethylammonium Bromide in a Concentration of 0.05 M<br><br>pH=3.5 | |
|---|---|---|---|---|
| | Right Eye | | Left Eye | |
| | Observation 24 h. after application | Observation 7 days after application | Observation 24 h. after application | Observation 7 days after application |
| No. 1 | Nothing | Nothing | 2+ | Healed. |
| No. 2 | ___do___ | ___do___ | 2+ | Do. |
| No. 3 | ___do___ | ___do___ | 2+ | Do. |
| No. 4 | ___do___ | ___do___ | 2+ | Do. |

TABLE IV

| Rabbits | Application of a Solution of— $$\left[ R.COOCH_2CHOHCH_2-N\begin{array}{c}CH_3\\CH_2-CH_2\\CH_2-CH_2\end{array}O \right]^+ SO_4CH_3^-$$ in a concentration of 0.1 M—(mol. wt.=537) in which R.COO= residue of tallow fatty acids. pH=3.5 | | Application of a Solution of Cetyltrimethylammonium Bromide in a Concentration of 0.1 M<br><br>pH=3.5 | |
|---|---|---|---|---|
| | Right Eye | | Left Eye | |
| | Observation 24 h. after application | Observation 7 days after application | Observation 24 h. after application | Observation 7 days after application |
| No. 1 | 2, weak | Healed | 3+++a | Healed. |
| No. 2 | Nothing | Nothing | 3+++a | Do. |
| No. 3 | ___do___ | ___do___ | 5+++b | Opaque cornea—eyelid wrinkled. |
| No. 4 | ___do___ | ___do___ | 3+++a | Opalescent cornea—eyelid wrinkled. |

TABLE V

| Rabbits | Application of a Solution of $$\left[ R.COOCH_2CHOHCH_2-N\begin{array}{c}CH_2C_6H_5\\C_2H_5\\C_2H_5\end{array}\right]^+ Cl^-$$ in a concentration of 0.1 M—(mol. wt.=523.5) in which R.COO = residue of tallow fatty acids. pH=3.5 | | Application of a Solution of Cetyltrimethylammonium Bromide in a Concentration of 0.1 M  pH=3.5 | |
|---|---|---|---|---|
| | Right Eye | | Left Eye | |
| | Observation 24 h. after application | Observation 7 days after application | Observation 24 h. after application | Observation 7 days after application |
| No. 1 | 2 | Healed | 3++a | Healed (traces cornea). |
| No. 2 | 2 | do | 3++a | Opalescent cornea—watering. |
| No. 3 | Nothing | Nothing | 2++a | Eyelid deformed—opaque cornea. |
| No. 4 | 2+ | Healed | 3+++ | Healed. |

TABLE VI

| Rabbits | Application of a Solution of $$\left[R.COO-CH_2CHOHCH_2-N\begin{array}{c}C_2H_5\\CH_2-CH_2\\ \diagdown\\ CH_2-CH_2\end{array}O\right]^+ I^-$$ in a concentration of 0.05 M—(mol. wt.=567) in which R.COO = residue of tallow fatty acids. pH=3.5 | | Application of a Solution of Cetyltrimethylammonium Bromide in a Concentration of 0.05 M  pH=3.5 | |
|---|---|---|---|---|
| | Right Eye | | Left Eye | |
| | Observation 24 h. after application | Observation 7 days after application | Observation 24 h. after application | Observation 7 days after application |
| No. 1 | Nothing | Nothing | 2+ | Healed. |
| No. 2 | do | do | 2++ | Do. |
| No. 3 | do | do | 2, weak | Do. |
| No. 4 | do | do | 2+ | Do. |

The symbols employed in the foregoing tables have the following meanings:

1=Irritation of the bulbar or palpebral conjunctivae,
2=Irritation of the bulbar and palpebral conjunctivae,
3=2 plus watering (healing),
4=3 plus non-purulent secretion (healing),
5=4 plus purulent secretion-closing of the eyelids—dull cornea with possible insensitivity (slow, but possible healing),
6=5 plus attack on the palpebral edges and even on the skin.

Numbers 1 to 6 may be followed by 1 to 5 crosses, depending upon the intensity of the action.

Since the corneal lesions are of two types, the numbers corresponding to the most aggressive action may also be followed by:

(a) Which corresponds to a loss of shine (dull cornea),
(b) Which corresponds to the more or less complete destruction of the corneal epithelium with more or less extensive ulceration and loss of corneal sensitivity.

The cornea may be attacked in 5 and in 6 either by the product itself or by the pathological conjunctival secretion produced by the product.

The loss of corneal sensitivity facilitates the production of ulceration.

It is further to be noted that, for use in shampoos, the quaternary ammonium compounds of general Formula I have the advantages that they are very stable to hydrolysis when they are in aqueous solution and at an acid pH. Thus, when an 0.1 M aqueous solution of these compounds, of a pH of 3.5, obtained by the addition of lactic acid, is heated on a boiling water bath, the rate of hydrolysis reaches only about 15% after heating for 40 hours, while it may reach 65% in the case of the non-quaternized compounds of the above Formula II when they are treated under the same conditions. This stability to hydrolysis constitutes an appreciable advantage in the case of commercial aqueous solutions. These solutions, when stored for several months, remain absolutely clear and consequently perfectly suitable for use.

Accordingly there are further provided, according to the present invention, compositions for use in cosmetics, more especially as shampoos, which contain quaternary ammonium compounds of general Formula I. Preferably such compositions contain 0.5 to 10% by weight of the quaternary ammonium compound.

The cosmetic compositions according to the invention are preferably aqueous solutions and there may be added thereto products and adjuvants such as are usually employed in cosmetics, for example thickeners or non-ionic compounds.

The following examples will serve to illustrate the invention. Examples 1 to 7 relate to compounds of general Formulae I and II and to their production, while Examples 8 to 10 relate to cosmetic compositions containing compounds of general Formula I.

*Example 1*

0.5 mol. of copra fatty acid is dissolved in 1 litre of isopropyl alcohol and the stoichiometric quantity of KOH in solution in a minimum of water is added. A part of the solvent is evaporated off with stirring to eliminate the water and the same quantity of isopropanol is added. There are then added, at a temperature between 45° and 50° C., with stirring, 0.5 mol. of epichlorohydrin and 0.5 mol. of diethylamine. The whole is maintained at 50° C. for 1 to 2 hours, and it is then heated under reflux for several hours until the amine number, determined in the usual way by volumetric titration with the aid of hydrochloric acid in alcoholic medium and in the presence of bromophenol blue, remains constant. The solution is half-concentrated, and then cooled to a temperature between 0° and 5° C. The potassium chloride formed and precipitated is separated off.

The amino ester thus obtained has the following analytical characteristics:

|  | Mol. wt. Theoretical | Mol. wt. Found |
|---|---|---|
| OH number | 330 | 322 |
| Saponification number | 330 | 329 |
| Amine number | 330 | 332 |

Quaternization is thereafter effected by adding a stoichiometrical quantity of dimethyl sulphate to the amino ester solution. After boiling for 2 hours, the solvent is evaporated, first under normal pressure and finally in vacuo in order to free the product from the final traces of isopropyl alcohol. There is thus obtained a compound of formula:

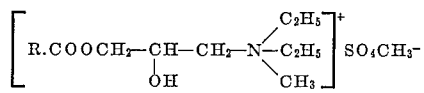

in which RCOO is a copra fatty acid residue.

This product is a yellow-colored viscous mass, readily soluble in water to give strongly foaming solutions.

The purity of this product is higher than 95%, according to titration by determination of the fatty acid content.

*Example 2*

By replacing, in Example 1, the diethylamine by diethanolamine, there is obtained a compound of the formula:

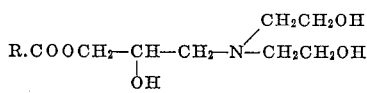

in which RCOO is a copra fatty acid residue.
Analytical characteristics:

|  | M.W. Theoretical | M.W. Found |
|---|---|---|
| OH Index | 374 | 368 |
| Saponification Index | 374 | 388 |
| Amine Index | 374 | 354 |

*Example 3*

Using the same conditions as in Example 1, but starting with a tallow fatty acid, there is obtained a compound of the formula:

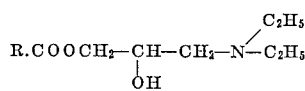

in which RCOO is a tallow fatty acid residue.
Analytical characteristics:

|  | M.W. Theoretical | M.W. Found |
|---|---|---|
| OH Index | 398 | 400 |
| Saponification Index | 398 | 398 |
| Amine Index | 398 | 414 |

*Example 4*

Using the same conditions as in Example 2, but replacing the copra fatty acid by tallow fatty acid, there is obtained a compound of the formula:

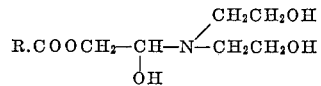

in which RCOO is a tallow fatty acid residue.
Analytical characteristics:

|  | M.W. Theoretical | M.W. Found |
|---|---|---|
| OH Index | 432 | 463 |
| Saponification Index | 432 | 437 |
| Amine Index | 432 | 404 |

*Example 5*

Using the same conditions as in Example 1, but replacing the copra fatty acid by tallow fatty acid, and using benzyl chloride as quaternizing agent, there is obtained a compound of the formula:

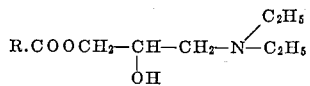

in which RCOO is a tallow fatty acid residue.
Analytical characteristics:

|  | M.W. Theoretical | M.W. Found |
|---|---|---|
| OH Index | 398 | 400 |
| Saponification Index | 398 | 398 |
| Amine Index | 398 | 414 |

*Example 6*

Using the same conditions as in Example 1, but replacing the diethylamine by morpholine and the copra fatty acids by tallow fatty acids, there is obtained a compound of the formula:

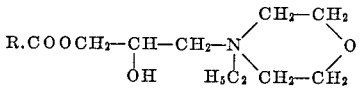

in which RCOO is a tallow fatty acid residue.
Analytical characteristics:

|  | M.W. Theoretical | M.W. Found |
|---|---|---|
| OH Index | 410 | 444 |
| Saponification Index | 410 | 391 |
| Amine Index | 410 | 384 |

*Example 7*

Using the same conditions as in Example 6, but using ethyl iodide instead of methyl sulphate in the quaternizing process, a compound of the following formula is obtained:

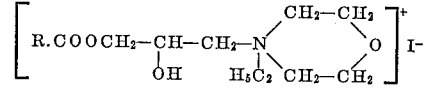

The purity of this product is from 85% to 90%.

*Example 8*

There is prepared a composition of the following:

| | | |
|---|---|---|
| $\left[\begin{array}{c}\text{R.COOCH}_2\text{—CH—CH}_2\text{—N}\begin{array}{c}\diagup\text{C}_2\text{H}_5\\ \diagdown\text{C}_2\text{H}_5\end{array}\\ \text{copra} \quad \text{OH} \quad \text{CH}_3\end{array}\right]^+ \text{SO}_4\text{CH}_3{}^-$ | G. | 2 |
| Ethyl alcohol | | 25 |
| Water, q.s. for 100 cc. | | |

The product is good anti-scruf lotion which has the advantage that it has substantially no irritating action on the conjunctiva of the eye.

*Example 9*

There is prepared a composition of the following:

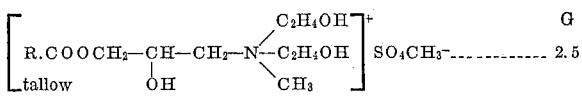 G. 2.5

Lauryl alcohol condensed with 10 mol. of ethylene oxide_____ 8.5
Water, q.s. for 100 cc.

The product is a good shampoo which has the advantage that it has substantially no irritating action on the conjuctiva of the eye.

*Example 10*

There is prepared a composition of the following:

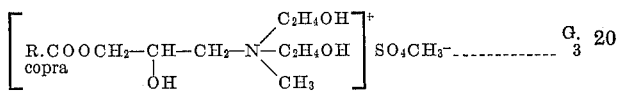 G. 3

Oxo alcohol, mol. wt.=200, condensed with 12.5 mol. of ethylene oxide_ 10
Lauryl imidazoline quaternized by monochloracetic acid_____ 5
Water, q.s. for 100 cc.

The product is a good shampoo which has the advantage that it has substantially no irritating action on the conjuctiva of the eye.

What is claimed is:

1. A quaternary ammonium compound of the formula:

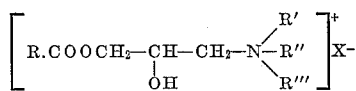

wherein
(a) R represents a hydrocarbon group of 10 to 18 carbon atoms;
(b) R' and R'' are selected from the group consisting of alkyl groups of 1 to 4 carbon atoms, hydroxyalkyl groups of 1 to 4 carbon atoms, and together with the nitrogen atom form a morpholine, piperidine or pyrrolidine group;
(c) R''' is selected from a group consisting of alkyl groups of 1 to 4 carbon atoms, hydroxyalkyl groups of 1 to 4 carbon atoms and an alkylphenyl group;
(d) and X is an anion.

2. A quaternary ammonium compound having the formula:

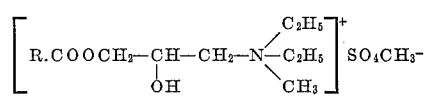

wherein R is a hydrocarbon froup of 10 to 18 carbon atoms.

3. A quaternary ammonium compound having the formula:

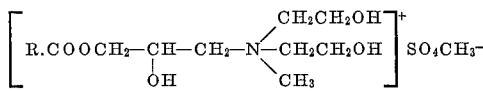

wherein R is a hydrocarbon group of 10 to 18 carbon atoms.

4. A quaternary ammonium compound having the formula:

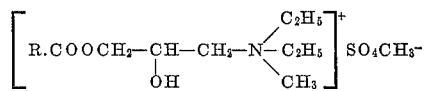

wherein R is a hydrocarbon group of 10 to 18 carbon atoms.

5. A quaternary ammonium compound having the formula:

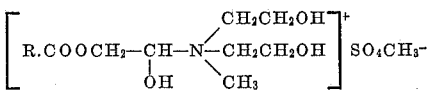

wherein R is a hydrocarbon group of 10 to 18 carbon atoms.

6. A quaternary ammonium compound having the formula:

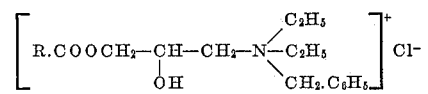

wherein R is a hydrocarbon group of 10 to 18 carbon atoms.

7. A quaternary ammonium compound having the formula:

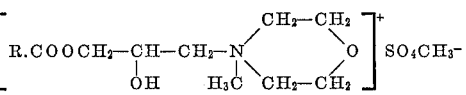

wherein R is a hydrocarbon group of 10 to 18 carbon atoms.

8. A quaternary ammonium compound having the formula:

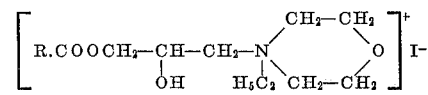

wherein R is a hydrocarbon group of 10 to 18 carbon atoms.

9. In a process for the production of a quaternary ammonium compound having the formula:

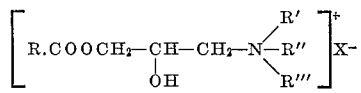

wherein
(a) R represents a hydrocarbon group of 10 to 18 carbon atoms;
(b) R' and R'' are selected from the group consisting of alkyl groups of 1 to 4 carbon atoms, hydroxyalkyl groups of 1 to 4 carbon atoms, and together with the nitrogen atom form a morpholine, piperidine or pyrrolidine group;
(c) R''' is selected from the group consisting of alkyl groups of 1 to 4 carbon atoms, hydroxyalkyl groups of 1 to 4 carbon atoms and an alkylphenyl group;
(d) and X is an anion, which comprises reacting together substantially equimolecular proportions of an alkali metal salt of an aliphatic carboxylic acid of 10 to 18 carbon atoms with an epihalohydrin and a secondary amine of the formula

in a solvent medium, separating the alkali metal halide which is formed, and thereby isolating a free base.

10. A hair shampoo preparation which consists essentially of a quaternary ammonium compound of the formula:

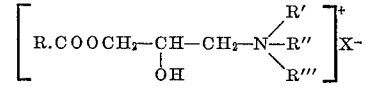

wherein
(a) R represents a hydrocarbon group of 10 to 18 carbon atoms;
(b) R' and R'' are selected from the group consisting of alkyl groups of 1 to 4 carbon atoms, hydroxyalkyl groups of 1 to 4 carbon atoms, and together with the nitrogen atom form a morpholine, piperidine or pyrrolidine group;
(c) R''' is selected from a group consisting of alkyl groups of 1 to 4 carbon atoms, hydroxyalkyl groups of 1 to 4 carbon atoms and an alkylphenyl group;
(d) and X is an anion, together with an inert carrier.

11. A hair shampoo containing 0.5% to 10% by weight of a quaternary ammonium compound having the formula:

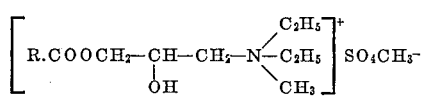

wherein R.COO is a copra fatty acid residue.

12. A hair shampoo containing 0.5% to 10% by weight of a quaternary ammonium compound having the formula:

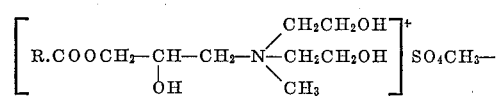

wherein R.COO is a copra fatty acid residue.

13. A hair shampoo containing 0.5% to 10% by weight of a quaternary ammonium compound having the formula:

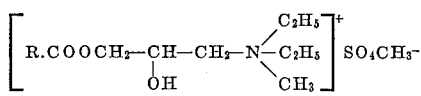

wherein R.COO is a tallow fatty acid residue.

14. A hair shampoo containing 0.5% to 10% by weight of a quaternary ammonium compound having the formula:

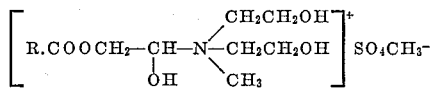

wherein R.COO is a tallow fatty acid residue.

15. A hair shampoo containing 0.5% to 10% by weight of a quaternary ammonium compound having the formula:

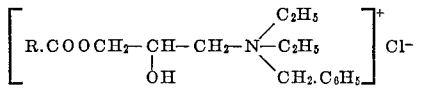

wherein R.COO is a tallow fatty acid residue.

16. A hair shampoo containing 0.5% to 10% by weight of a quaternary ammonium compound having the formula:

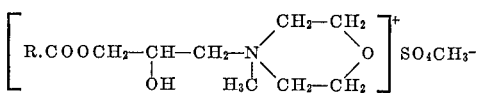

wherein R.COO is a tallow fatty acid residue.

17. A hair shampoo containing 0.5% to 10% by weight of a quaternary ammonium compound having the formula:

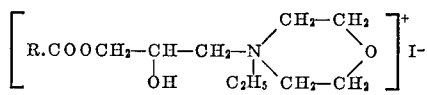

wherein R.COO is a tallow fatty acid residue.

18. A hair shampoo containing 0.5% to 10% by weight of a quaternary ammonium compound of the formula:

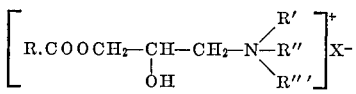

wherein:
(a) R represents an aliphatic fatty acid residue of 9 to 17 carbon atoms;
(b) NR'R'' is selected from the group consisting of alkyl amine group having 1 to 4 carbon atoms, hydroxy alkyl amine group having 1 to 4 carbon atoms, morpholine group, piperidine group and pyrrolidine group;
(c) R''' is selected from a group consisting of alkyl groups of 1 to 4 carbon atoms, hydroxyalkyl groups of 1 to 4 carbon atoms and a

group;
(d) and X is an anion.

No references cited.

ALEX MAZEL, *Primary Examiner.*
JOSE TOVAR, *Assistant Examiner.*